(No Model.)
A. BERRYHILL.
PIPE JOINT.
No. 393,684. Patented Nov. 27, 1888.
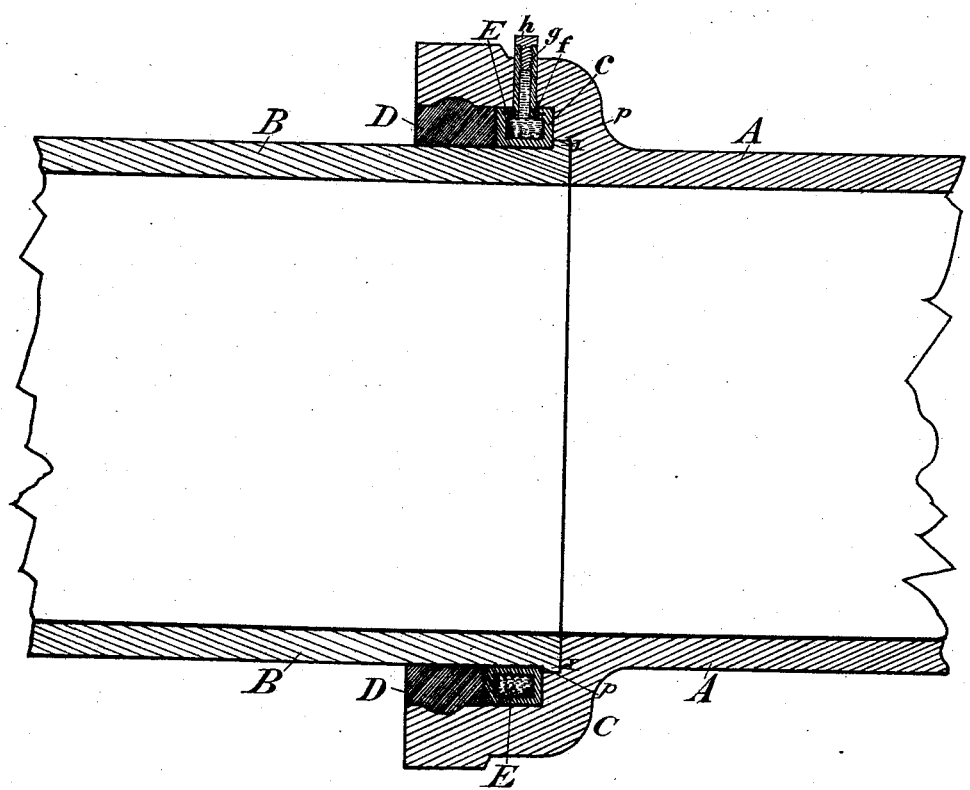
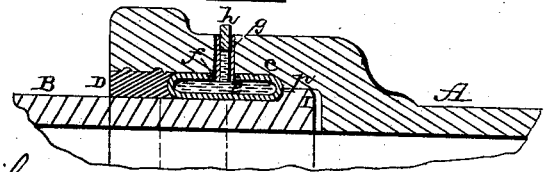
WITNESSES:
George Pfeil.
Edward C. Orth.
INVENTOR.
Albert Berryhill
F. A. Lehmann.
ATTORNEY.

United States Patent Office.

ALBERT BERRYHILL, OF PITTSBURG, PENNSYLVANIA.

PIPE-JOINT.

SPECIFICATION forming part of Letters Patent No. 393,684, dated November 27, 1888.

Application filed July 16, 1887. Serial No. 244,458. (No model.)

*To all whom it may concern:*

Be it known that I, ALBERT BERRYHILL, of the city of Pittsburg, in the county of Allegheny and State of Pennsylvania, have invented a new and useful Improvement in Pipe-Joints; and I hereby declare the following specification to be a full, clear, and exact description thereof.

My invention relates to an improvement in pipe-joints; and it consists in the combination of two pipes, a suitable joint for connecting them together, a hollow yielding ring provided with an opening in one side to receive a filling, and a packing inserted into the end of the pipe-joint, as will be more fully described hereinafter.

The object of my invention is to form a tight and elastic or yielding joint to which pressure may be applied, whereby the joint may be absolutely gas-tight.

The accompanying drawing represents vertical sections of a pipe-coupling embodying my invention, slightly different forms being shown.

A represents one pipe, which has a bowl formed therein, and at the inner end of this bowl is an offset or shoulder, $p$, and the pipe B has formed upon its spigot end the flange I, which fits in the offset $p$ and forms a closely-fitting joint. In forming the surfaces of the offset $p$ it is not necessary that they should be absolutely tight-fitting; but any differences between the surfaces can be filled with cement or other material. Where a tight fit between the surfaces of the offset $p$ is required the ends of the pipe are to be placed in a suitable machine for this purpose. I do not limit myself to this form of fitting; but the flange can be used without the offset, or the offset can be used without the flange. Only one form of pipe-coupling is here shown; but it is evident that my invention may be applied to the ordinary sleeve-coupling. In that case the ends of the two pipes B will be inserted in each end of the sleeve, and then the packings are to be placed in each end of the sleeve. Any suitable form of joint can be used. The bowl-joint is here shown only because it is the simplest form of pipe that is used.

Placed in the bowl of the pipe A is an elastic, malleable, or other kind of ring, C, which is capable of yielding in all directions, and which makes a complete circuit in the back part of the bowl, as shown. I prefer to make this ring C oblong in cross-section; but it can be made of any form or shape desired. This ring C has a small annular ring, $f$, cast or fixed in its top, and into this ring $f$ is secured a tube, $g$, which passes through an opening through the bowl and screws into the ring $f$, as shown. The ring C is to be filled with a filling of a fluid, semi-fluid, or any other kind of material which will answer for the purpose, and this filling is retained in the ring, and pressure is applied thereto by means of the plug $h$, which screws into the outer end of the tube $g$, or by any suitable compressing apparatus. As a general thing, a filling, preferably of some liquid or semi-liquid material, will be used, so that it can contract and expand equally with the pipe. When a hard filling is to be used, it will be poured into the ring C while in a dry or melted condition. I do not limit myself in this respect, because the filling material may be varied in a great many different ways.

The ring D is inserted in the outer end of the bowl and formed in any desired manner. This packing D and the ring C are placed in direct contact. After applying pressure to the filling E, plug $h$ is inserted, which retains the filling E under or in a state of pressure or in a state of expansion, according to the kind of filling used.

Having thus described my invention, I claim—

1. The combination of two pipes and a suitable pipe-joint with the hollow ring C, made of any suitable yielding material and having an opening, the ring F, which is inserted around the opening in the ring C, the tube $g$, and the plug $h$, the ring C being adapted to receive a suitable filling and to be made to conform to the space in which it is placed, substantially as shown.

2. The combination of two pipes, which are connected together by a suitable pipe-joint, with the hollow yielding ring C, which has an opening through its outer side to receive a suitable filling, and the packing-ring D, which is inserted in the end of the pipe-joint and made to abut against the ring C, substantially as shown and described.

3. The combination of two pipes which are connected together by a suitable pipe-joint, the hollow ring C, made of any suitable yielding material and having an opening in its top, the ring *f*, which is inserted in the ring C around the opening, the tube *g*, the plug *h*, and the packing D, placed in the outer end of the joint, substantially as set forth.

4. The combination of two pipes, which are connected together by a suitable pipe-joint, with the hollow ring C, made of any suitable yielding material and having an opening to receive a suitable filling, the ring *f*, which is inserted around the opening, the tube *g*, the plug *h*, and a suitable jointing behind the ring C, substantially as shown and specified.

ALBERT BERRYHILL.

Witnesses:
GEORGE PFEIL,
EDWARD C. ORTH.